(12) United States Patent
Ma et al.

(10) Patent No.: US 10,481,575 B2
(45) Date of Patent: Nov. 19, 2019

(54) THERMAL COMPENSATION METHOD AND THERMAL COMPENSATION CONTROL SYSTEM FOR MACHINE TOOLS

(71) Applicant: INDUSTRIAL TECHNOLOGY RESEARCH INSTITUTE, Hsinchu (TW)

(72) Inventors: Sheng-Ming Ma, Taichung (TW); Ta-Jen Peng, Taichung (TW); Yung-Chih Lin, Taichung (TW); Chien-Hung Chen, Taichung (TW); Ke-Hen Chen, Taichung (TW); Shin-Tzong Su, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 41 days.

(21) Appl. No.: 15/855,924

(22) Filed: Dec. 27, 2017

(65) Prior Publication Data

US 2019/0171176 A1    Jun. 6, 2019

(30) Foreign Application Priority Data

Dec. 5, 2017    (TW) .............................. 106142613 A

(51) Int. Cl.
*B23Q 11/00* (2006.01)
*G05B 19/048* (2006.01)
(Continued)

(52) U.S. Cl.
CPC ........ *G05B 19/048* (2013.01); *B23Q 11/0007* (2013.01); *B23Q 17/22* (2013.01); *G05B 17/02* (2013.01); *G05B 2219/39192* (2013.01)

(58) Field of Classification Search
CPC ............ B23Q 11/0007; B23Q 11/0003; B23Q 17/22; G05B 2219/39192
See application file for complete search history.

(56) References Cited

U.S. PATENT DOCUMENTS 4,100,837 A     7/1978 Kohler
5,257,460 A *  11/1993 McMurtry ........... G01B 21/047
                                                         33/502
(Continued)

FOREIGN PATENT DOCUMENTS

CN        1468365 A      1/2004
CN      102166722 A      8/2011
(Continued)

OTHER PUBLICATIONS

TW Office Action dated Jul. 2, 2018 as received in Application No. 106142613.

*Primary Examiner* — Alan Snyder
(74) *Attorney, Agent, or Firm* — Maschoff Brennan

(57) ABSTRACT

A thermal compensation control system for a machine tool having a milling cutter and a cutter driver includes a tool setting probe, a temperature sensor, a workpiece touch probe, and a controller. The cutter driver is connected to the milling cutter to drive the milling cutter to process the work piece based on a control signal. The tool setting probe is configured to detect a cutter length of the milling cutter. The temperature sensor is configured to sense a measured temperature of the cutter driver or the milling cutter. The workpiece touch probe is configured to measure processing errors of the processed work piece. The controller is configured to generate the control signal based on a processing instruction, a temperature compensation model, the cutter length, and the measured temperature. The controller is further configured to determine whether to modify the temperature compensation model based on the processing errors.

9 Claims, 7 Drawing Sheets

(51) Int. Cl.
　　　*G05B 17/02*　　　(2006.01)
　　　*B23Q 17/22*　　　(2006.01)

(56)　　　　References Cited

U.S. PATENT DOCUMENTS

| | | | |
|---|---|---|---|
| 5,303,458 | A | 4/1994 | Sheehan et al. |
| 5,647,137 | A * | 7/1997 | McMurtry ............ B23Q 1/4876 |
| | | | 192/139 |
| 5,795,112 | A | 8/1998 | Senda |
| 8,255,075 | B2 | 8/2012 | Ou et al. |
| 8,924,003 | B2 | 12/2014 | Maekawa et al. |
| 2006/0089745 | A1 | 4/2006 | Suzuki et al. |
| 2012/0123586 | A1 | 5/2012 | Maekawa et al. |
| 2013/0190921 | A1 | 7/2013 | Maekawa |
| 2016/0001410 | A1 * | 1/2016 | Koyama ............ B23Q 11/0007 |
| | | | 700/170 |
| 2016/0124420 | A1 | 5/2016 | Murahashi et al. |

FOREIGN PATENT DOCUMENTS

| | | |
|---|---|---|
| CN | 103223629 A | 7/2013 |
| CN | 101394969 B | 3/2014 |
| CN | 103984287 A | 8/2014 |
| CN | 102452020 B | 8/2016 |
| CN | 206039266 U | 3/2017 |
| TW | I314078 B | 9/2009 |
| TW | 201409195 A | 3/2014 |
| TW | I448353 B | 8/2014 |
| TW | I459166 B | 11/2014 |

* cited by examiner

THERMAL COMPENSATION METHOD AND THERMAL COMPENSATION CONTROL SYSTEM FOR MACHINE TOOLS

CROSS-REFERENCE TO RELATED APPLICATIONS

This non-provisional application claims priority under 35 U.S.C. § 119(a) on Patent Application No(s). 106142613 filed in Taiwan, R.O.C. on Dec. 5, 2017, the entire contents of which are hereby incorporated by reference.

TECHNICAL FIELD

The disclosure relates to a machine tool with a thermal compensation control system and a control method thereof.

BACKGROUND

Precision testing tools installed by general factories, such as tool setting probes, are used for measuring in the state of non-processing and incapable of maintaining the accuracy in the state of processing and for a long time. In order to achieve stabilization in a long time of processing, it is necessary to establish a compensation system to suppress the thermal deformation.

In addition, regarding a controller of a machine tool, it is necessary to purchase extra control cards and input/output cards, increase the memory and modify the interface in order to add a thermal compensation function. After the hardware is completed, it is still necessary to implement modeling technologies after the machine sheet metal interface is removed. Finally, an ideal reference temperature position and a compensation equation are obtained via analysis. In general, the modeling process takes more than one week, and the thermal compensation model can not be easily changed. The original thermal compensation model for the original machine needs to be modified after essential elements (e.g. spindle, oil cooler, etc) of the machine are replaced. If the effect of the replacement is significant, then it is unavoidable to reconstruct the model.

Since the process of thermal compensation is complicated and is an open-loop control system, various factors, such as worn-out of a machine tool and lose of the accuracy of parts, lead to inaccuracy of thermal compensation models. This problem is not overcome immediately until the measurement result of work pieces is obtained so the problem of the compensation distortion is informed. The result will lead to processing errors or machining errors and accordingly it results in losses of time and money.

SUMMARY

A thermal compensation control system for a machine tool according to one embodiment of the present disclosure is disclosed. The control system is adapted to perform a thermal compensation for the machine tool. The machine tool has a cutter and a driver configured to drive the cutter or a work piece. The system has a tool setting probe, a temperature sensor, a workpiece touch probe and a controller. The driver is connected to the cutter to drive the cutter according to a control signal so as to process the work piece. The tool setting probe is configured to detect a cutter length of the cutter. The temperature sensor is configured to detect a measured temperature corresponding to the cutter or the driver. The workpiece touch probe is configured to measure a set of processing errors of the work piece. The controller is electrically connected to the driver, the tool setting probe, the temperature sensor and the workpiece touch probe, and generates the control signal according to a processing instruction, a temperature compensation model, the cutter length and the measured temperature. The controller determines whether to modify the temperature compensation model according to the set of processing errors.

A thermal compensation method for a machine tool according to one embodiment of the present disclosure is disclosed. The method includes the following steps: detecting a cutter length of a cutter; detecting a measured temperature corresponding to the cutter or a driver; generating a control signal according to a processing instruction, a temperature compensation model, the cutter length and the measured temperature; driving the cutter according to the control signal so as to process the work piece; measuring a set of processing errors of the work piece processed and determines whether to modify the temperature compensation model according to the set of processing errors.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
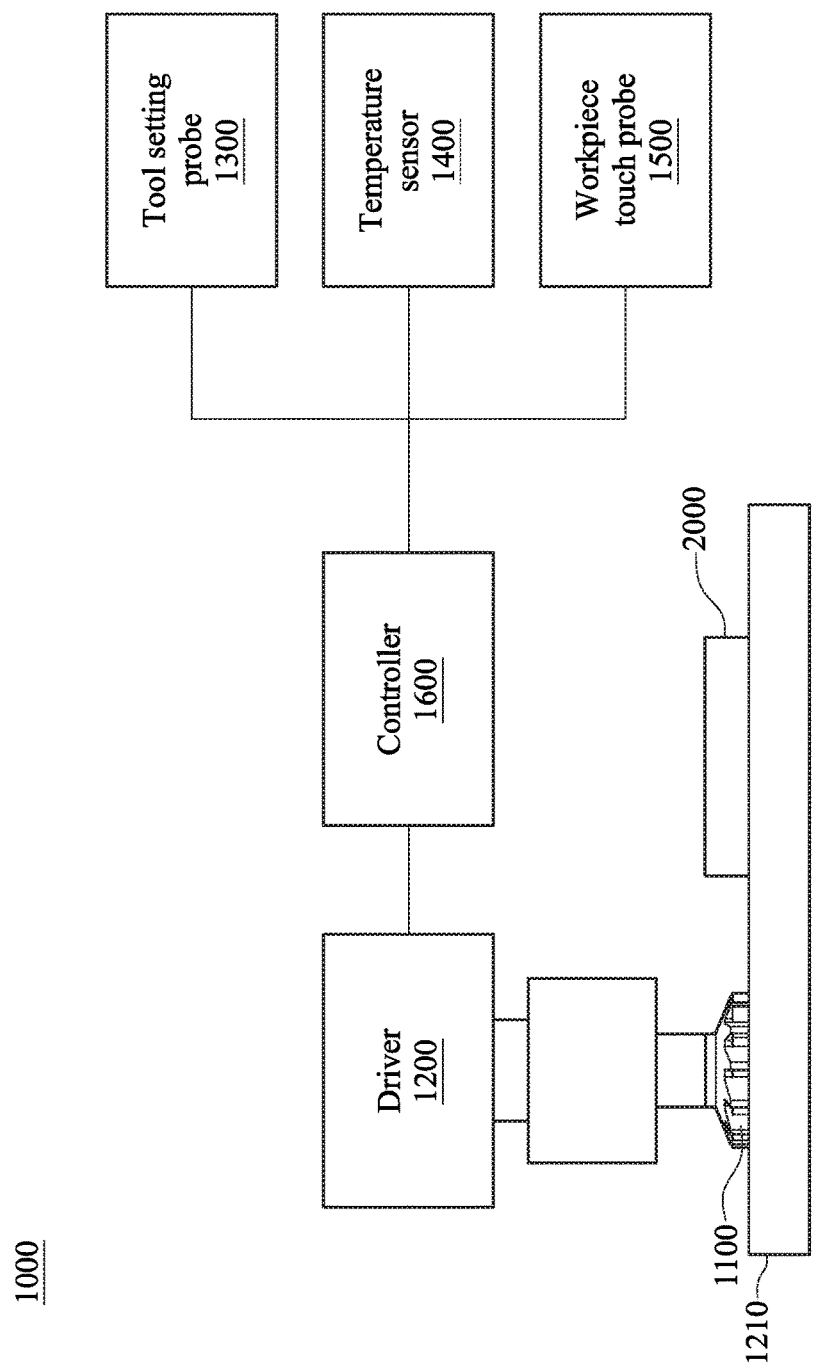
FIG. 1 is a diagram of a structure of a thermal compensation control system for a machine tool.

Please refer to FIG. 1, which is a diagram of a structure of a thermal compensation control system for a machine tool. As shown in FIG. 1, according to one embodiment of the present disclosure, a machine tool 1000 having a thermal compensation control system has a cutter 1100, driver 1200, a tool setting probe 1300, a temperature sensor 1400, a workpiece touch probe 1500 and a controller 1600.

The driver 1200 is connected to the cutter 1100 to drive the cutter 1100 according to a control signal so as to process a work piece 2000. Specifically, the driver 1200 is connected to the cutter 1100 through a rotation axis. The machine tool 1000 is, for example, a machine tool having a function of multi-axis processing. The driver 1200 drives the cutter 1100 to rotate based on a required rotating speed according to the control signal. In addition, the driver 1200 is a generalized driver such as a drive capable of controlling a cutter to move based on a required feed rate according to a control signal, or a driver capable of controlling a platform 1210 according to a control signal so as to drive a work piece 2000 to move based on a required feed rate. Specifically, in an example, the driver 1200 of the machine tool 1000 has a plurality of motors including general motors and/or stepper motors.

The tool setting probe 1300 is called a tool presetter used for detecting the length of the cutter 1100. Specifically, the tool setting probe 1300 is capable of detecting the length of a cutter by contacting, by projecting, or by positioning using laser. The present disclosure is not limited to the implementations of the above examples.

The temperature sensor 1400 is configured to detect measured temperature of the cutter 1100 or the driver 1200. In one embodiment, the temperature sensor 1400 is, for example, a (non-contact) infrared temperature sensing device used for measuring temperature of the cutter 1100 or the driver 1200 so as to obtain measured temperature. In another embodiment, the temperature sensor 1400 is, for example, disposed on a specific element of the driver 1200 to obtain the measured temperature in contact.

Specifically, a specific axial error is generated or the feed rate is changed when the temperature of a specific element of the driver 1200 increases, wherein the specific element is, for example, a rotation axis or a shaft increases. However, a key element of a machine tool leading to thermal errors may be different from that of another machine tool. Therefore, for the purpose of obtaining the temperature of the key element of a machine tool at the thermal error issue, the key elements vary from one type of machine tools to another. Persons having ordinary skills in the art are able to select a specific element from the drive to be measured according demands as well as the type of the machine tool.

The workpiece touch probe 1500 is configured to measure a set of processing errors of a work piece to be processed. Specifically, for example, the workpiece touch probe 1500 has a built-in medium or an external medium. A variety of predetermined parameters, predetermined 2D models or predetermined 3D models of the work piece 2000 which has been processed are stored in the built-in medium or the external medium. The predetermined parameters are, for example, a group of coordinates related to the outer surface of the work piece 2000. In an example, the workpiece touch probe 1500 obtains a variety of measurement parameters of the work piece 2000 which has been processed by an infrared scanning. In one embodiment, the workpiece touch probe 1500 generates a statistical result of the set of processing errors by directly comparing the measurement parameters to the measurement parameters. In another embodiment, the workpiece touch probe 1500 constructs a 2D measurement model or a 3D measurement model based on the measurement parameters, and further compares the constructed measurement model to a stored predetermined measurement model so as to obtain a statistical result of the set of processing errors.

The controller 1600 is electrically connected to the driver 1200, the tool setting probe 1300, the temperature sensor 1400 and the workpiece touch probe 1500. The controller 1600 generates the control signal according to a processing instruction, a temperature compensation model, the cutter length and the measured temperature, and determines whether to modify the temperature compensation model according to the set of processing errors.

Specifically, the temperature compensation model is obtained by constructing in advanced or training based on the previous result of processing of the machine tool. When the temperature compensation model is constructed, the controller 1600 obtains the cutter length through the tool setting probe 1300 to modify errors of the rotating speed. Specifically, for some cutters, the cutter length is different from a predetermined cutter length in an orthogonal direction of the axial of the rotating axis with the increase of the rotating speed, so a rotating compensation model is constructed based on the cutter length and the rotating speed.

Then, the controller 1600 obtains the measured temperature corresponding to the cutter 1100 or the driver 1200 and an axial error. In one embodiment, the work piece is processed and the work piece is measured by the workpiece touch probe 1500 to obtain the axial error. However, in another embodiment, the controller 1600 is equipped with an extra distance-measuring device and controls the driver 1200 to drive the cutter 1100 to perform an idle running based on a specific rotating speed, so that the distance-measuring device obtains the errors of the cutter 1100 along the axial of the rotation axis of the driver 1200.

Then, the controller 1600 obtains the temperature compensation model according to the measured temperature and the quantity of deformation (an axial error and/or an error due to the cutter length). Specifically, the methods of training the temperature compensation model include, for example, a regression analysis, an artificial neural network, a finite element analysis and a dynamic error analysis, etc.

An example regarding a multiple regression analysis is given below:

First, a single predetermined variable is extended to a plurality of predetermined variables $X_1, X_2, \ldots, X_k$, a multiple regression model and a hypothesis thereof are as follows:

$$Y_i = \beta_0 + \beta_1 X_{1i} + \beta_2 X_{2i} + \ldots + \beta_k X_{ki} + \varepsilon_i, i=1,2,\ldots,n$$

wherein:

Y represents an error correction factor needed to be predicted. In one embodiment, Y is a compensation quantity of an original on a 3D coordinate system. $X_1, X_2, \ldots, X_k$, represent independent variables, in other words, in the embodiment of the present disclosure, $X_1, X_2, \ldots, X_k$ are, for example, measured rotating speeds or measured temperatures. $\beta_0, \beta_1, \ldots, \beta_k$ represent model parameters, wherein is called as a intercept and $\beta_1, \beta_2, \ldots, \beta_k$ are called as regression coefficients. $\varepsilon_i$ represents a random error, which is an unavoidable tolerance, for example.

The model is expressed in matrix:

$$Y = \begin{bmatrix} Y_1 \\ Y_2 \\ \vdots \\ Y_n \end{bmatrix}, X = \begin{bmatrix} 1 & X_{11} & X_{21} \\ 1 & X_{12} & X_{22} \\ \vdots & \vdots & \vdots \\ 1 & X_{1n} & X_{2n} \end{bmatrix}, \beta = \begin{bmatrix} B_0 \\ B_1 \\ B_2 \end{bmatrix}, \varepsilon = \begin{bmatrix} \varepsilon_1 \\ \varepsilon_2 \\ \vdots \\ \varepsilon_n \end{bmatrix}$$

wherein the temperature compensation model is expressed as $Y = X\beta + \varepsilon$ If evaluating a relationship between the error correction factor Y and those independent variables (e.g. measured rotating speeds, one or more measured temperatures), then it is illustrated as follows:

$$SST = S_{YY} = \sum_{i=1}^{n} (Y_i - \overline{Y})^2 =$$

$$\sum_{i=1}^{n} (Y_i - \hat{Y}_i + \hat{Y}_i - \overline{Y})^2 = \sum_{i=1}^{n} (\hat{Y}_i - \overline{Y})^2 + \sum_{i=1}^{n} (Y_i - \hat{Y}_i)^2 = SSR + SSE$$

wherein $$SST = S_{YY} = \sum_{i=1}^{n} (Y_i - \overline{Y})^2$$

indicates a total sum of squares corresponding to $Y_i$ and $\overline{Y}$, representing a total quantity of deformation.

$$SSR = \sum_{i=1}^{n} (\hat{Y}_i - \overline{Y})^2$$

indicates a sum of squares due to regression, representing a part among the total quantity of deformation, with the part illustrated based on regression.

$$SSE = \sum_{i=1}^{n} (Y_i - \hat{Y}_i)^2$$

indicates a sum of squares for error, representing anther part among the total quantity of deformation, with the another part unable to be illustrated.

In other word, the sum of squares for error SSE is minimized by adjusting each regression coefficient, so that a proper error correction factor Y, namely the compensation quantity of the origin on the 3D coordinate system, is obtained. Moreover, the unavoidable tolerance (e.g. the error standard deviation as described later) is minimized as well.

In one embodiment, the operation of the artificial neural network is described below. An example of radial basis function (RBF) is illustrated as follows:

First, RBF neural network has m hidden neurons (m operators in logical), and n input values are obtained, wherein both of m and n are positive integers and generally greater than one, wherein the input values are, for example, parameters such as rotating speeds or measured temperatures, etc, and an output value is given accordingly as follows:

$$y = \sum_{j=1}^{m} w_j R(\|X - C_j\|)$$

wherein y represents the output value. Specifically, the output value represents the processing errors. wj represents a weight of jth hidden neuron, R( ) represent a radial basis function such as a Gaussian function, a polynomial quadratic inverse function, a polynomial quadratic function or other proper functions, X represents a group of the n input values, and Cj represents a central point of the jth hidden neuron, An ideal wj and Cj are obtained through a proper training and adjustment, so that an accurate prediction value of the processing error is obtained. Accordingly, a desired compensation quantity for the origin is obtained.

In one embodiment, the controller 1600 generates an error compensation instruction according to the temperature compensation model, the cutter length and the measured temperature, and further generates the control signal according to the processing instruction and the error compensation instruction. Specifically, the processing instruction determines information such as rotating speeds, feed rates and specific coordinates. For example, the error compensation instruction adjusts the coordinates system. For example, the error compensation instruction is a coordinate compensation value, so a specific coordinate in the processing instruction is modified by the coordinate compensation value. It means that the origin of the coordinates system of the machine tool 1000 is modified.

In one embodiment, the controller 1600 further obtains a rotating speed instruction (a rotating speed determined by the processing instruction) from the processing instruction, and adjusts the error compensation instruction further according to the rotating speed instruction when the error compensation instruction is generated. Specifically, as described above, when the temperature compensation model is constructed, the rotating speed of the cutter is related to the errors. Therefore, in this embodiment, the controller 1600 further inputs the rotating speed instruction into the temperature compensation model so as to obtain a compensation instruction (a coordinate compensation value).

In another embodiment, since the rotating speed instruction is not necessarily consistent to the actual rotating speed and drivers of some machine tools further have rotating speed measurement devices, the controller in this kind of machine tool obtains the rotating speed value of the cutter from the driver and generates the error compensation instruction according to the rotating speed value instead of the rotating speed instruction. In addition, in a further another embodiment, the difference between the rotating speed instruction and the actual rotating speed is related to the temperature and also leads to the processing errors, therefore, in this embodiment, both of the rotating speed instruction and the rotating speed value are considered when the errors compensation instruction is generated.

Figure 2A:
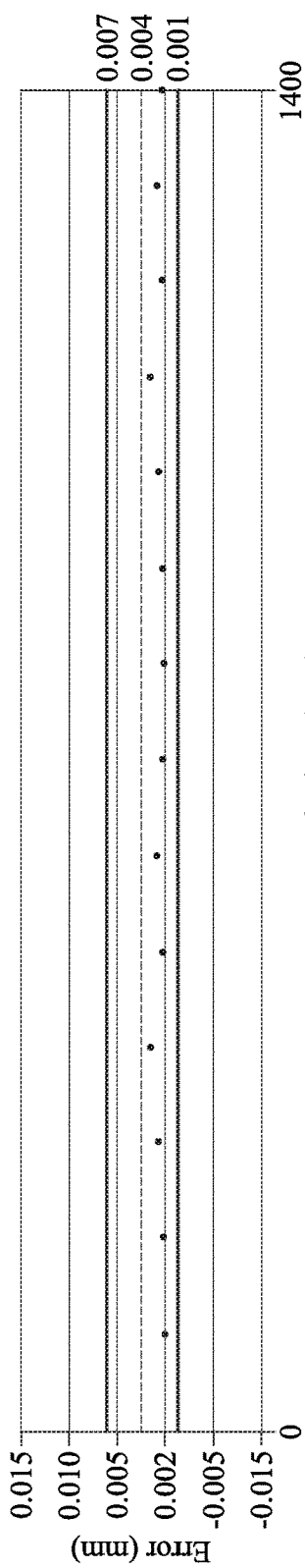
FIG. 2A to FIG. 2B are diagrams of processing data distribution related to the temperature compensation model before modification according FIG. 1 of the present disclosure.
Figure 2B:
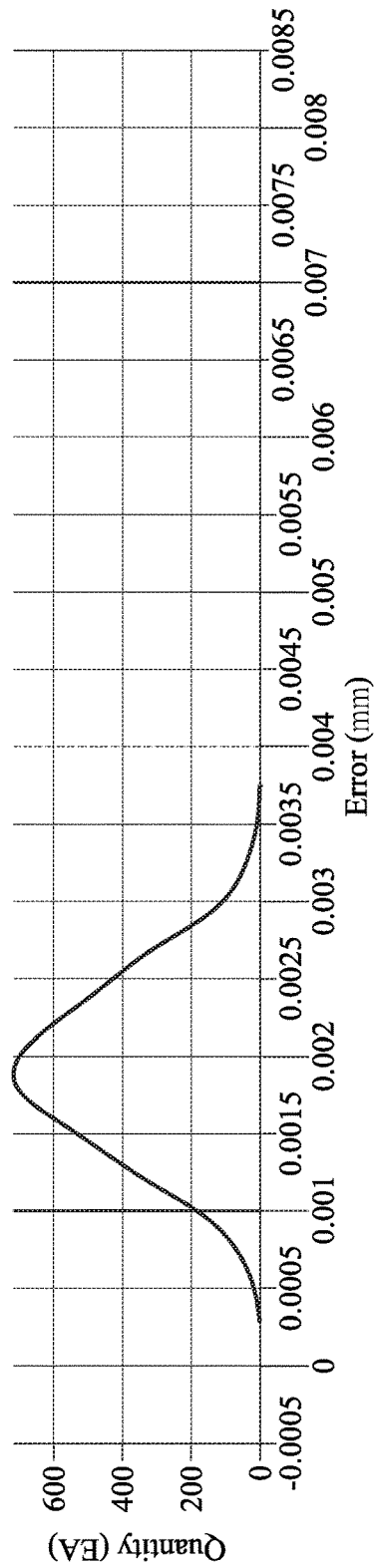
Figure 3A:
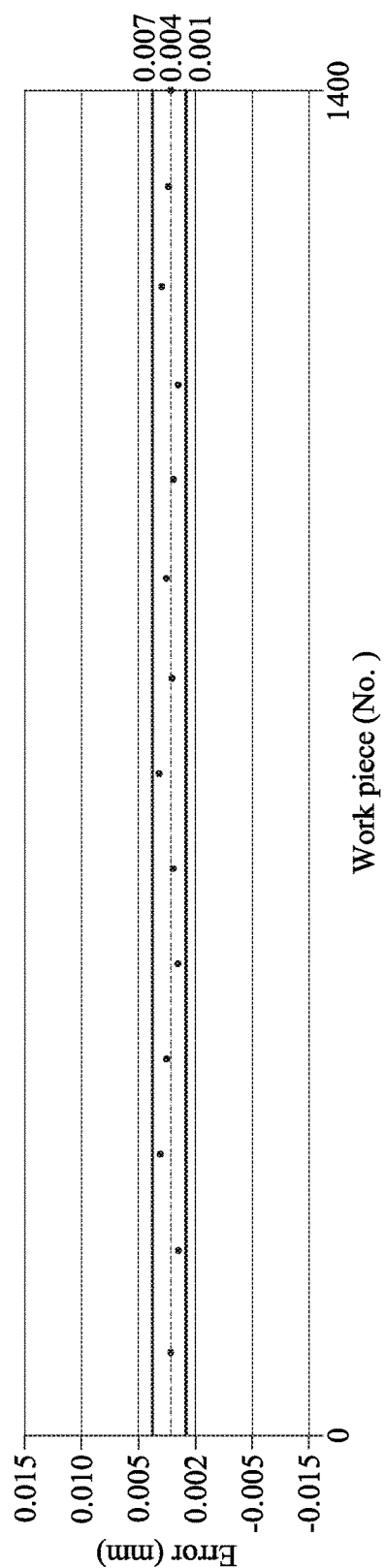
FIG. 3A to FIG. 3B are diagrams of processing data distribution related to the temperature compensation model after modification according FIG. 1 of the present disclosure.
Figure 3B:
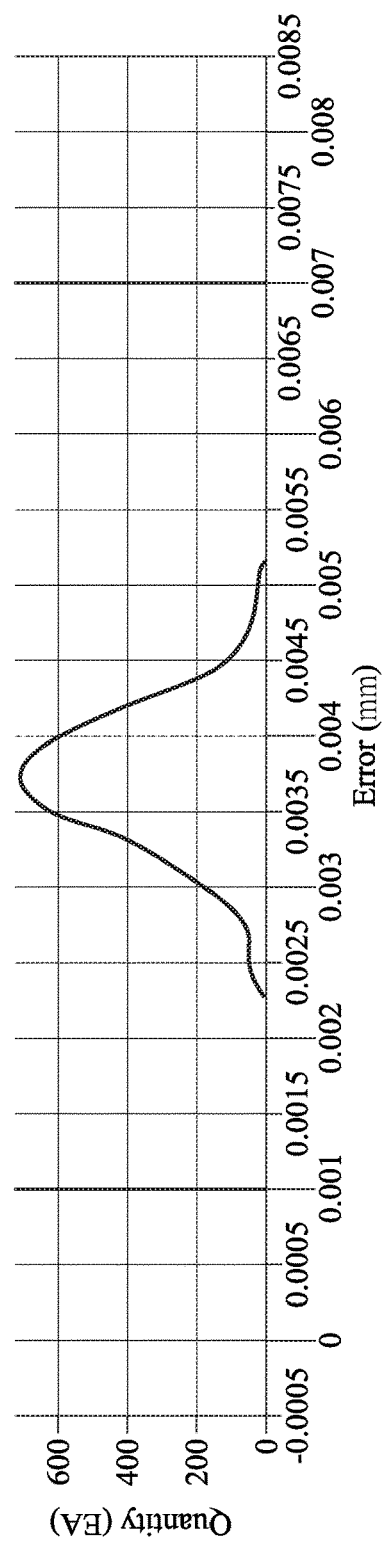

In an embodiment, when the controller 1600 determines whether to modify the temperature compensation model according to the set of processing errors, the controller 1600 determines whether the processing errors is within a first error range or not. When the set of processing errors is not within the first error range, the controller 1600 determines to modify the temperature compensation model. For example, the information of the set of processing errors includes a plurality of error values measured by the workpiece touch probe 1500 after a single work piece 2000 is processed. The controller 1600 calculates a distribution of the plurality of error values. Please refer to FIGS. 2A-2B and FIGS. 3A-3B, wherein FIGS. 2A-2B are diagrams of processing data distribution illustrating a condition in which a temperature compensation model need to be modified, and FIG. 3A-FIG. 3B are diagrams of acceptable processing data distribution after modification. The vertical axes of FIG. 2A and FIG. 3A indicates measured errors, and the horizontal axes of FIG. 2A and FIG. 3A indicates the number of work pieces (No.). The horizontal axes of FIG. 2B and FIG. 3B indicates processing errors and the vertical axes of FIG. 2B and FIG.

3B indicates the total quantities of work pieces corresponding to the processing errors. In the embodiments of FIG. 2A and FIG. 2B, the acceptable error is, for example, 0.004 mm±0.002 mm. As shown in the embodiment of FIG. 2B, the distribution center of the error values deviates from the goal (0.004 mm) for −0.0021 mm, so the controller 1600 determines to modify the temperature compensation model. In the embodiments of FIG. 3A and FIG. 3B, the processing errors are within an acceptable range, so the controller 1600 determines not to modify the temperature compensation model.

In an embodiment, the controller 1600 further has a storage medium (not shown in figures), and the controller 1600 writes the set of processing errors, obtained after the work piece 2000 is processed, into the storage medium as a plurality of sets of history errors. Furthermore, the controller 1600 determines whether to modify the temperature compensation model according to latest N sets of history errors among the plurality of sets of history errors, wherein N is an integer greater than one. Specifically, N is 20, for example. In other words, the controller 1600 determines whether to modify temperature compensation model based on the latest 20 sets of history errors.

Specifically, each set of history errors includes, for example, 100 data points, and each data point defines a processing error value of the work piece on a specific coordinate of a point selected to be measured. In practical example, although the distribution of error values related to 100 data points of a work piece meets the standard, the distribution of error values of $45^{th}$ data point of each of the latest sets of history errors may not meet the standard. In this case, the controller 1600 determines to modify the temperature compensation model.

In an embodiment, the controller 1600 calculates an error average value with respect to kth data point of each of the N sets of history errors, and determines whether the error average value is within a second error range or not. When the error average value is not within the second error range, the controller 1600 determines to modify the temperature compensation model. The second error range is, for example, defined such that a maximum error is ±0.06 mm, and an acceptable error value of distribution center is, for example, not beyond ±0.025 mm.

In another embodiment, the controller 1600 calculates an error standard deviation of the N sets of history errors and determines whether the error standard deviation is greater than a tolerance or not. When the error standard deviation is greater than the tolerance, the controller 1600 determines to modify the temperature compensation model. The error standard deviation corresponds to a processing tolerance of the machine tool 1000, so the controller 1600 determines to modify the temperature compensation model when the processing tolerance is greater than the tolerance. The error standard deviation is not limited to the error standard deviation of 100 data points of the latest set of processing errors or the error standard deviation of specific data points of the latest 20 sets of history errors.

In a further another embodiment, when the controller 1600 determines to modify the temperature compensation model, the controller 1600 modifies the temperature compensation model according to the error standard deviation. In another embodiment, when the controller 1600 determines to modify the temperature compensation model, the controller 1600 modifies the temperature compensation model further according to the error average value.

Figure 4:
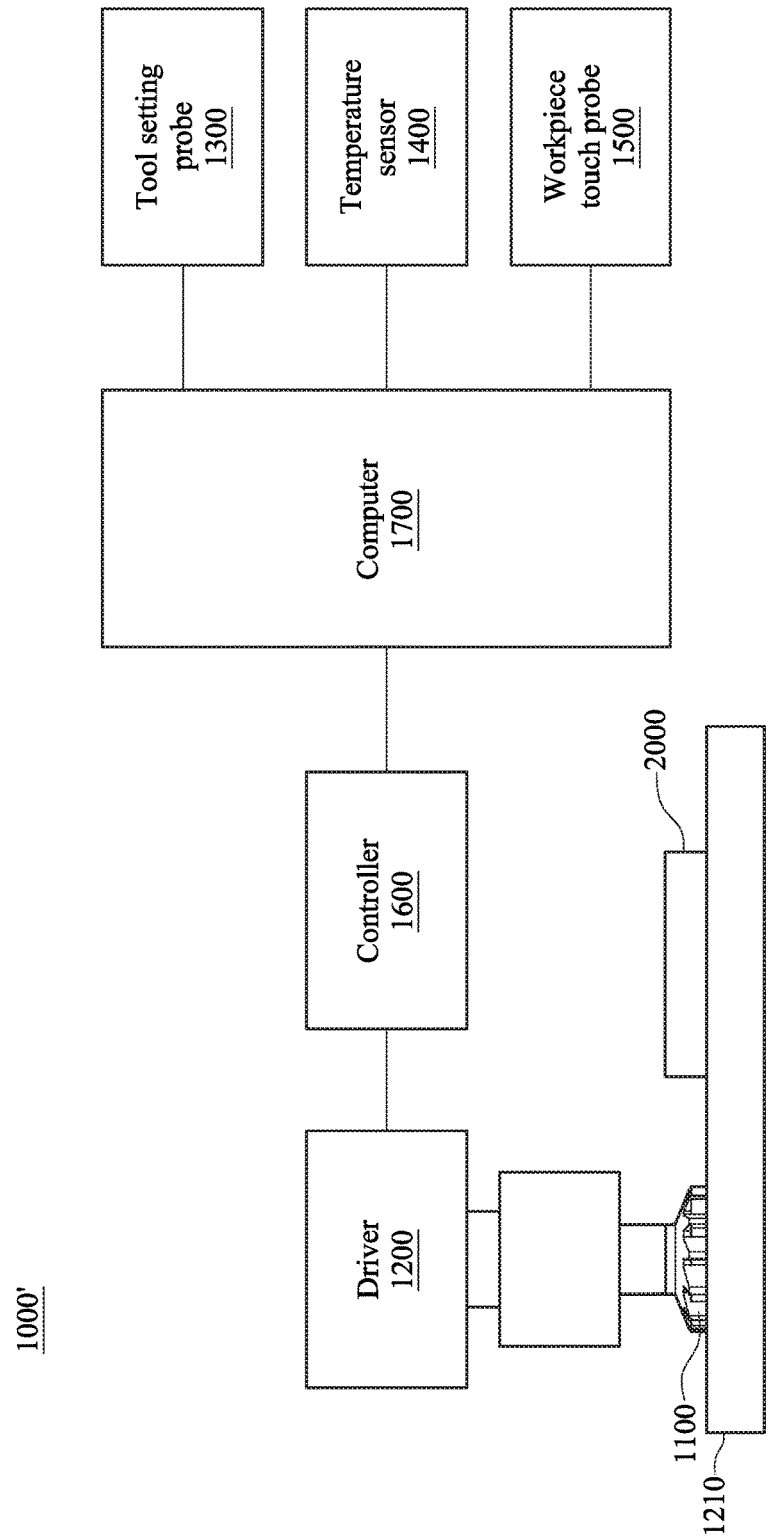
FIG. 4 is a diagram of a structure of a machine tool thermal compensation control system according to another embodiment of the present disclosure.

In the embodiments described above, all of the tool setting probe 1300, the temperature sensor 1400 and the workpiece touch probe 1500 are electrically connected to the controller 1600. In other words, for example, the temperature compensation model is implemented in the logic computation of the controller 1600 in the above embodiments. The machine tool 1000 is properly equipped with the tool setting probe 1300, the temperature sensor 1400 and the workpiece touch probe 1500 in the above embodiments. However, in another embodiment, a machine tool may be modified properly to implement the above functions. Specifically, please refer to FIG. 4, which is a diagram of a structure of a machine tool thermal compensation control system according to another embodiment of the present disclosure. The difference between the machine tool 1000' shown in FIG. 4 and the machine tool 1000 shown in FIG. 1 lies in that the tool setting probe 1300, the temperature sensor 1400 and the workpiece touch probe 1500 of the machine tool 1000' are electrically connected to a computer 1700. The computer 1700 generates an error compensation instruction according to the temperature compensation model, the cutter length and the measured temperature. The controller 1600 receives the error compensation instruction and further generates control a signal according to the errors compensation instruction and a processing instruction. In addition, the computer 1700 determines whether to modify the temperature compensation model or not according to the set of processing errors. In other words, the construction and the modification of the temperature compensation model as well as the generation of the error compensation instruction according to the temperature compensation model are processed by the computer 1700. The controller 1600 of the machine tool 1000' generates the control signal only according to the errors compensation instruction and the processing instruction. Therefore, a conventional machine tool properly, equipped with the tool setting probe, the temperature sensor and the workpiece touch probe, is capable of implementing the techniques of the present disclosure.

Figure 5:
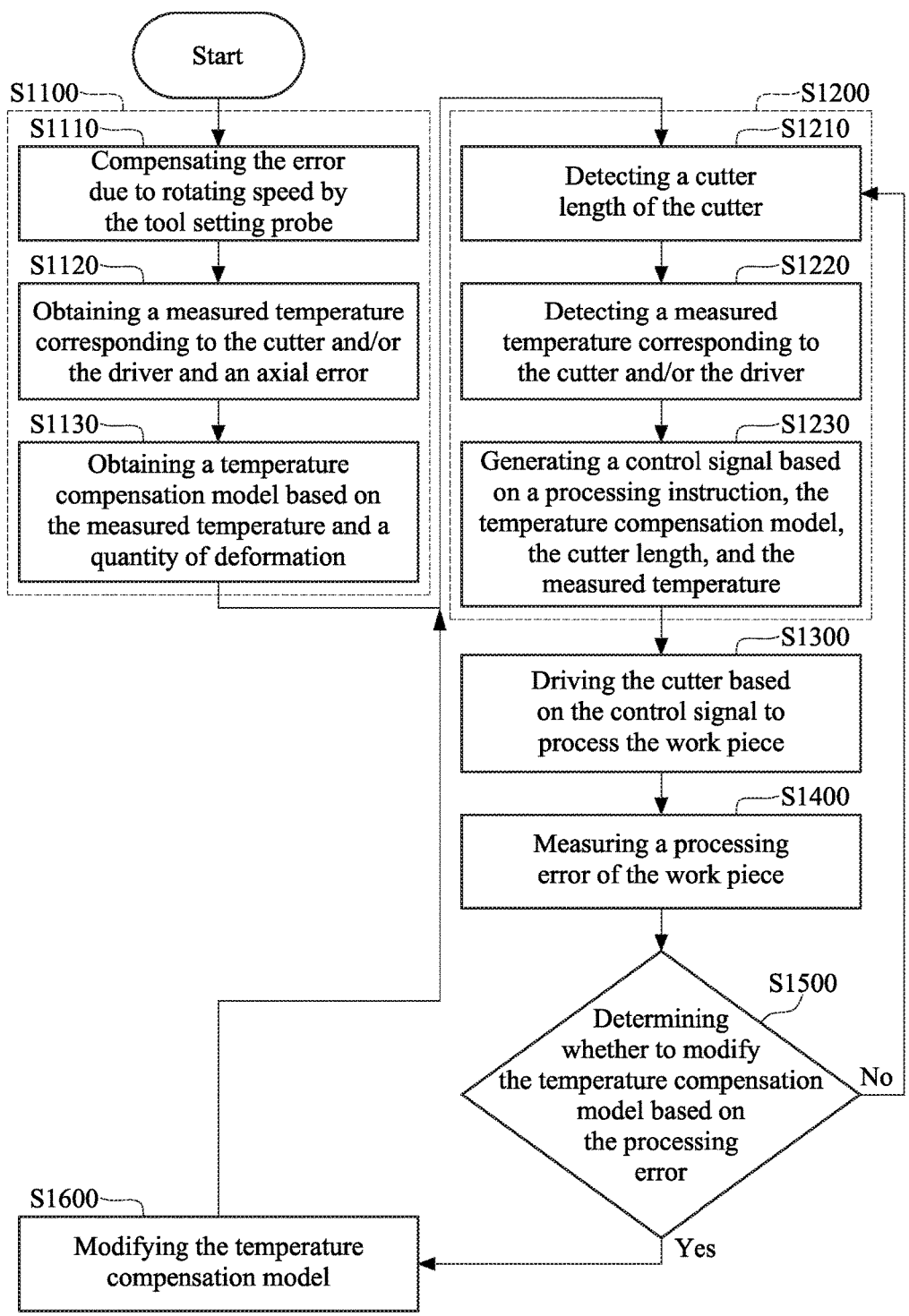
FIG. 5 is a thermal compensation method for a machine tool according one embodiment of the present disclosure.

Therefore, please refer to FIG. 5, which is a thermal compensation method for a machine tool according one embodiment of the present disclosure. The thermal compensation for the machine tool includes step S1100 of constructing a temperature compensation model. Step S1200 to step S160 illustrate the control method of the machine tool. Step S1100 includes: in step S1110, compensating the error due to rotating speed by tool setting probe; in step S1120, obtaining the measured temperature corresponding to the cutter 1100 or the driver 1200 and an axial error; in step S1130, obtaining the temperature compensation model based on the measured temperature and the quantity of deformation (including an axial error and errors due to the rotating speed) the temperature compensation model. Step S1200 includes: in step S1210, detecting a cutter length of the cutter 1100; in step S1220, detecting the measured temperature corresponding to the cutter 1100 or the driver 1200; in step S1230, generating a control signal based on a processing instruction, the temperature compensation model, the cutter length and the measured temperature; in step S1300, driving the cutter 1100 based on the control signal to process the work piece 2000; in step S1400, measuring a processing error of the work piece 2000. Step S1500 is performed when the process for the work piece 2000 is completed or a suspended time exists in the processing procedure of the work piece 2000. In step S1500, determining whether to modify the temperature compensation model based on the processing error. For example, a measurement for the processing error is performed when the process for the work piece 2000 is completed. In addition, when the processing for a part of the work piece 2000 is completed, additional elements need to be equipped via other robotic arms of the machine tool. In this case, a shape of the part, formed by a previous processing, remains unchanged, and it is difficult to measure the processing error after the additional elements are equipped. Therefore, the processing error of the part processed is measured by the workpiece touch probe 1500 before the additional elements are equipped. If it is determined that it is not necessary to modify the temperature compensation model, then return to step S1210 for proceeding the following process or a process for a next work piece. If it is determined that it is necessary to modify the temperature compensation model, then modifying the temperature compensation model as shown in step S1600. Then, return to step S1210 after the modification is completed.

Figure 6:
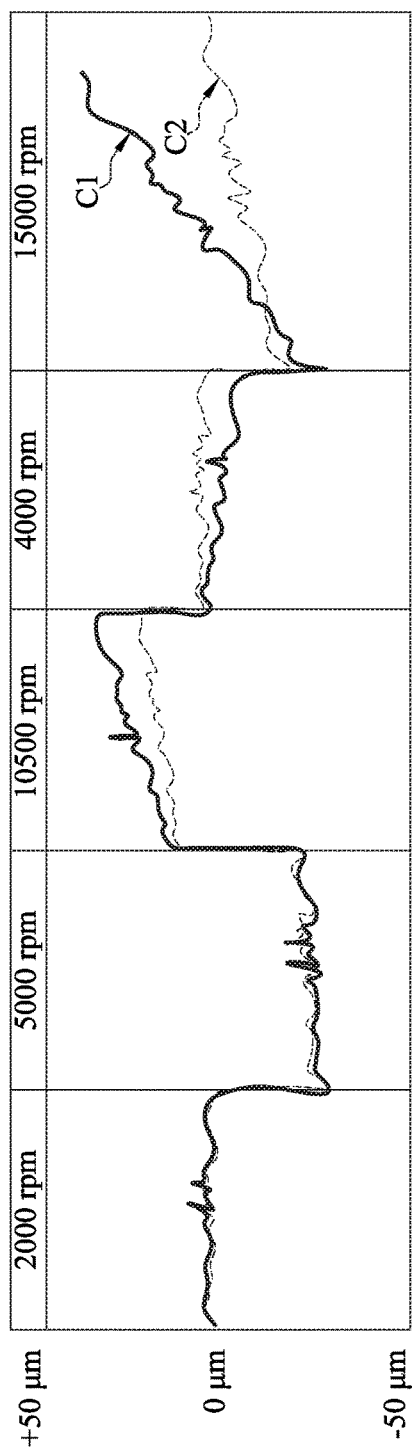
FIG. 6 is a diagram of processing result based on the conventional techniques.
Figure 7:
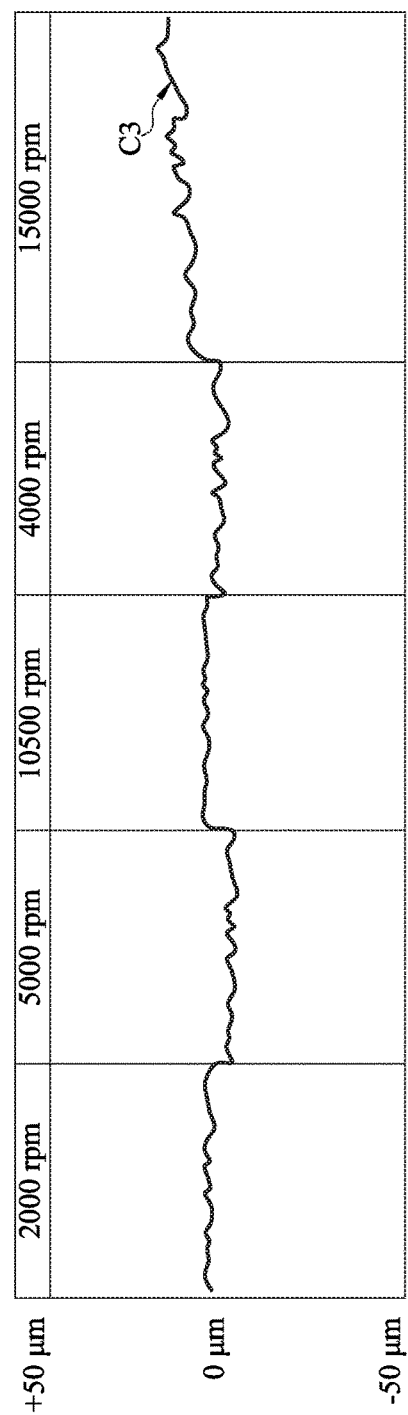
FIG. 7 is a diagram of processing result after a thermal compensation based on the techniques of thermal compensation for the machine tool according to FIG. 1 and FIG. 4 of the present disclosure.

Please refer to FIG. 6 and FIG. 7 in order to realize that the present disclosure solves the problems of conventional techniques, wherein FIG. 6 is a diagram of processing result based on the conventional techniques, and FIG. 7 is a diagram of processing result based on the techniques of thermal compensation for the machine tool disclosed in the present disclosure. Please refer to FIG. 6, the vertical axis indicates the error quantity, and the horizontal axis indicates the rotating speed of the cutter in different time periods. The curve C1 represents the result without using thermal compensation in the conventional techniques, and the curve C2 represents the result using thermal compensation in the conventional techniques. As shown in FIG. 6, a significant step still exists as the rotating speed switches even though the error amount is reduced through the temperature compensation. As shown in FIG. 7, the curve C3 represents the result using the machine tool disclosed by the present disclosure. Comparing the curve C3 of FIG. 7 to the curves C1/C2 of FIG. 6, it is found that not only the error quantity is reduced significantly, but also the step as the rotating speed switches is reduced significantly.

Based on the above descriptions, in the thermal compensation control system for the machine tool and the method thereof according to one embodiment of the present disclosure, the rotating speed is taken into account in the temperature compensation model and the work piece is measured online, therefore, the temperature compensation model is modified immediately so as to avoid decreases of yield rate of processing due to the model inaccuracy.

What is claimed is:

1. A thermal compensation control system for a machine tool, with the machine tool having a cutter and a driver for driving the cutter or a work piece, the system comprising:
   a tool setting probe configured to detect a cutter length of the cutter;
   a temperature sensor configured to detect a measured temperature corresponding to the cutter or the driver;
   a workpiece touch probe configured to measure a set of processing errors of the work piece; and
   a controller electrically connected to the driver, the tool setting probe, the temperature sensor and the workpiece touch probe, is configured to generate a control signal for controlling the driver according to a processing instruction, a temperature compensation model, the cutter length and the measured temperature;
   wherein the controller further determines whether to modify the temperature compensation model or not according to the set of processing errors;
   wherein the controller further has a storage medium, the controller writes the set of processing errors into the storage medium as a plurality of sets of history errors and the controller determines whether to modify the temperature compensation model or not according to latest N sets of history errors among the plurality of sets of history errors, wherein N is a positive integer greater than one.

2. The thermal compensation control system for the machine tool according to claim 1, wherein the controller generates an error compensation instruction according to the temperature compensation model, the cutter length and the measured temperature, and the controller generates the control signal according to the processing instruction and the error compensation instruction.

3. The thermal compensation control system for the machine tool according to claim 2, wherein the controller further obtains a rotating speed instruction from the processing instruction, and generates the error compensation instruction further according to the rotating speed instruction.

4. The thermal compensation control system for the machine tool according to claim 2, wherein the controller further obtains a rotating speed value from the driver, and generates the error compensation instruction further according to the rotating speed value.

5. The thermal compensation control system for the machine tool according to claim 1, wherein, when determining whether to modify the temperature compensation model or not, the controller determines whether the set of processing errors is within in a first error range or not according to the set of processing errors, and the controller determines to modify the temperature compensation model when the set of processing errors is not within in the first error range.

6. The thermal compensation control system for the machine tool according to claim 1, wherein the controller calculates an error average value of the latest N sets of history errors and determines whether the error average value is within a second error range or not, and the controller determines to modify the temperature compensation model when the error average value is not within the second error range.

7. The thermal compensation control system for the machine tool according to claim 6, wherein the controller modifies the temperature compensation model further according to the error average value when the controller determines to modify the temperature compensation model.

8. The thermal compensation control system for the machine tool according to claim 1, wherein the controller further calculates an error standard deviation of the latest N sets of history errors and determines whether the error standard deviation is greater than a tolerance or not, and the controller determines to modify the temperature compensation model when the error standard deviation is greater than the tolerance.

9. The thermal compensation control system for the machine tool according to claim 8, wherein the controller modifies the temperature compensation model according to the error standard deviation when the controller determines to modify the temperature compensation model.

* * * * *